UNITED STATES PATENT OFFICE.

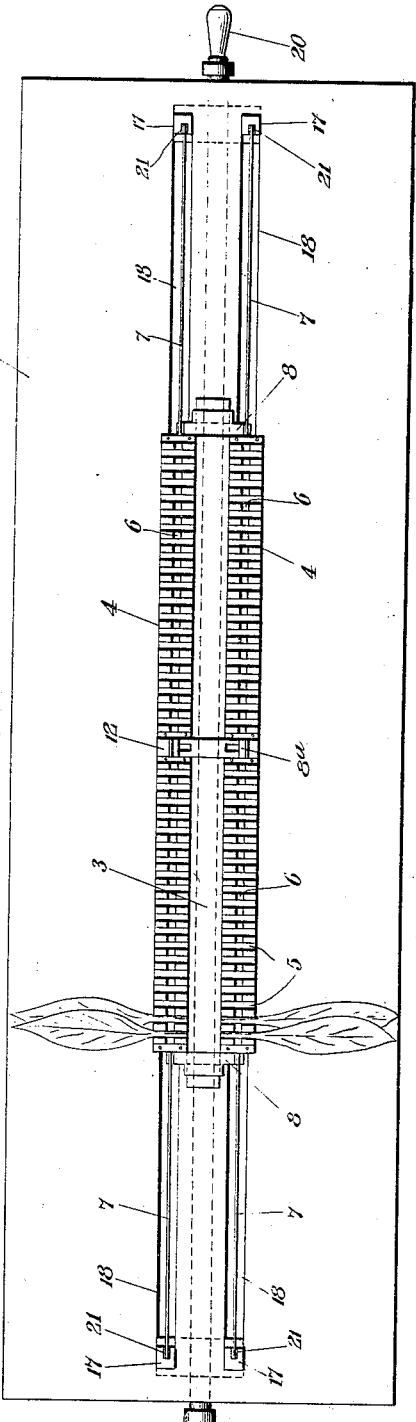

ALFRED SCHNEIDER, OF ROCKVILLE, CONNECTICUT.

APPARATUS FOR ASSEMBLING AND SUSPENDING TOBACCO-LEAVES.

1,055,664.     Specification of Letters Patent.     Patented Mar. 11, 1913.

Application filed March 25, 1912. Serial No. 686,215.

*To all whom it may concern:*

Be it known that I, ALFRED SCHNEIDER, a citizen of the United States, and resident of Rockville, in the county of Tolland and State of Connecticut, have invented certain new and useful Improvements in Apparatus for Assembling and Suspending Tobacco-Leaves, of which the following is a specification.

This invention relates to an apparatus for assembling tobacco leaves in spaced relation to each other whereby they can be efficiently suspended for curing or other treatment; the principal object of my invention being to provide a structure of large capacity whereby the leaves can be readily and effectually strung or assembled in proper order, and at the same time be associated with a suspension lath in such manner that when the latter is horizontally supported in the curing house, &c., the row or rows of leaves will be freely suspended.

With this and other objects in view my invention, as generally stated, comprises a novel construction and organization of mechanism whereby the leaves are separated and arranged in one or more rows, and whereby an impaling needle or needles is or are caused to penetrate the stems of the leaves and efficiently connect them together and to an adjacent suspension lath.

The invention also comprises various novel structural features and combination of parts whereby substantial advantages are gained, as will be hereinafter described and claimed.

In the drawings—Figure 1 is a plan of an apparatus embodying a good form of my invention, several tobacco leaves being indicated as applied thereto. Fig. 2 is a side elevation of the same. Fig. 3 is a transverse vertical section, as on the line 3—3 of Fig. 1. Fig. 4 is a perspective view of a part of a suspension lath with needle supports, one of the needles being illustrated as partly broken away and the other as impaling a row of suspended leaves. Fig. 5 is a transverse section through the slat and the middle needle-supporting bracket, as on the line 5—5 of Fig. 4. Fig. 6 is a perspective view of one end of the stem-holding structure.

1 designates a table of appropriate shape and size for its intended purpose. Upon the top of the table are preferably arranged two parallel bars 2 which extend longitudinally of the table and afford between them a space to receive the suspension lath 3. Each of these bars supports longitudinally thereof a stem-holder 4 embodying a multiplicity of adjacent transverse clamping members which are adapted to receive and hold the stems of the leaves while the bodies of the latter are supported upon the top of the table, as illustrated. This holder structure preferably, though not essentially, comprises one or more strips of sheet metal of suitable width and length bent into sinuous form to produce a series of adjacent vertical spaces 5 which readily receive, and by their opposing walls effectually clamp, the stems of the tobacco leaves. This structure is slotted longitudinally throughout its length and to a sufficient depth, as at 6, so as not only to permit the entrance and horizontal passage of a needle, as 7, to and through the supported stems of the leaves, but also to enable such needle, with the row of leaves strung thereon, to be bodily lifted up from the structure and transported thence to the desired location for suspension.

Although my invention contemplates in its broad aspect the use of a single stem-retaining structure and a single needle co-acting therewith, yet in the specific construction herein selected as illustrative of an apparatus of large capacity, I employ two retaining structures—one upon each bar—and I employ for each structure two needles which are adapted to enter in opposite directions the respective ends of the structure and to advance to or near to an intermediate point of the structure.

The suspension lath 3, which is imposed on the table between the parallel stem-retaining structures, is provided at its respective ends with brackets 8 which are constructed and arranged to afford horizontal seats for the needles as and when they enter the stem-retaining structures, and the lath is also provided, at a point midway between its ends, with a substantially similar bracket 8ª whereof the seats receive the points of the needles when the latter have entirely penetrated the opposing stems of the leaves. Hence the lath, with the needles supported thereon and impaling the two rows of leaves, can be bodily lifted from the apparatus and carried to and mounted in a curing-house, &c. Thereupon the leaves will be freely suspended from the needles, in spaced relation to each other, as illustrated in Fig. 4. Each of the brackets preferably comprises a body portion 9 looped or shaped to receive the lath, and provided with laterally extending arms 10 terminating in horizontally grooved or channeled portions 11 which constitute the seats for the needles. The channeled arms of the central bracket are preferably wider than those of the end brackets in order to afford appropriate seats for the points of the respective needles. To accommodate the arms of this central bracket and permit their seats to aline with the paths of the needles, suitably-located spaces, as at 12, are provided in the respective holder structures.

When two rows of leaves have been oppositely disposed on the table and their stems applied to the holder structures, the needles 7 are preferably actuated to advance them simultaneously into the structures and through the opposing stems as above mentioned. The means herein illustrated for so actuating the needles is as follows: Mounted in depending bearing brackets 13 beneath the table is a shaft 14 which extends from end to end of the table, and is provided near its respective ends with oppositely screw-threaded portions 15. Upon each of these portions is mounted an internally threaded block 16 having two arms 17 which rise through and above longitudinal slots 18 in the table, the construction being such that when the shaft is rotated in the proper direction the block, with its arms, will be advanced toward or retracted from the holder structures. Preferably guide rods 19 for the blocks are arranged beneath the respective ends of the table, said rods being suitably supported in the adjacent depending brackets 13. In the present instance the shaft is illustrated as provided at its ends with cranks 20 for direct manual operation, but it is obvious that the shaft may be appropriately belted or geared with any suitable source of power.

The upper ends of the arms 17 are provided with sockets or recesses 21 disposed to receive the outer ends of the needles and thus serve as rearward abutments to support and advance the needles when the blocks are impelled by actuation of the screw-shaft; it being noted that the points of the needles preparatory to their advancement by the blocks are supported upon the grooved or seat portions of the respective end brackets 8 of the suspension lath.

From the foregoing it will be seen that my invention provides an apparatus of simple and efficient construction and operation whereby extensive rows of tobacco leaves can be expeditiously and economically assembled in spaced relation to each other upon the usual suspension lath.

It is to be understood that I do not limit myself to the particular form or details of construction herein shown and described to illustrate my invention, as the apparatus may be variously modified without departure from the fair spirit of the invention.

I claim—

1. The combination with a bed, a row of adjoining holders thereon, a needle, and means for moving said needle longitudinally through the row of holders, of a suspension slat provided with needle-seat members projecting into the path of the needle through the holders.

2. The combination with a bed, a row of adjoining holders thereon, needles movable longitudinally into and through said row of holders from opposite ends of the row, and means for simultaneously actuating said needles, of a suspension slat provided with needle-seat members projecting into the paths of the respective needles through the holders.

3. The combination with a bed, two parallel rows of adjoining holders, needles adapted to be moved longitudinally into and through the respective rows of holders, and means for actuating said needles, of a suspension slat adapted to be interposed between the two rows of holders, provided with oppositely-disposed needle-seat members projecting into the paths of the respective needles through the holders.

4. The combination with a bed, two parallel rows of adjoining holders, two oppositely-movable pairs of needles adapted to be moved longitudinally into both rows of holders from the respective ends of the latter, and means for simultaneously actuating said needles, of a suspension slat adapted to be interposed between the two rows of holders, provided with oppositely-disposed needle-seat members projecting into the paths of the respective needles through the holders.

5. The combination with a bed, a row of adjoining holders thereon, an abutment member movable toward and from one end of the row, a needle extending between the end of the row and the abutment and adapted to be forced by the latter longitudinally into and through the respective holders, and means for actuating said abutment member, of a suspension slat provided with needle-seat members projecting into the path of the needle through the holders.

6. The combination with a bed, a row of adjoining holders thereon, needles movable longitudinally into and through the row of holders from the opposite ends of the latter, oppositely-movable abutment members engaged with the respective needles, said abutment members including screw-engaging portions, and an operating shaft therefor having oppositely-screw-threaded portions, of a suspension slat provided with needle-seat members projecting into the paths of the respective needles through the holders.

Signed at New York in the county of New York and State of New York this 18th day of March A. D. 1912.

ALFRED SCHNEIDER.

Witnesses:
 JOHN R. NOLAN,
 B. CHANDLER SNEAD.

Copies of this patent may be obtained for five cents each, by addressing the "Commissioner of Patents, Washington, D. C."